(12) United States Patent
Widmann et al.

(10) Patent No.: US 10,695,951 B2
(45) Date of Patent: Jun. 30, 2020

(54) DRILLING TOOL

(71) Applicant: Robert Bosch GmbH, Stuttgart (DE)

(72) Inventors: Rainer Widmann, Bodnegg (DE);
Alexander Volz, Baienfurt (DE);
Massimo Anghileri, Solothurn (CH);
Miriam Kederer, Zuchwil (CH); Xiao Qiu, Weingarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/773,677

(22) PCT Filed: Nov. 4, 2016

(86) PCT No.: PCT/EP2016/076648
§ 371 (c)(1),
(2) Date: May 4, 2018

(87) PCT Pub. No.: WO2017/080917
PCT Pub. Date: May 18, 2017

(65) Prior Publication Data
US 2018/0326618 A1    Nov. 15, 2018

(30) Foreign Application Priority Data

Nov. 3, 2016 (DE) .......................... 10 2016 221 515

(51) Int. Cl.
*B28D 1/14* (2006.01)
*B23B 51/02* (2006.01)
*E21B 10/44* (2006.01)

(52) U.S. Cl.
CPC .............. *B28D 1/146* (2013.01); *B23B 51/02* (2013.01); *E21B 10/445* (2013.01);
(Continued)

(58) Field of Classification Search
CPC ............. E21B 10/445; B23B 2251/046; B23B 2251/248; B23B 2251/446;
(Continued)

(56) References Cited

U.S. PATENT DOCUMENTS 6,655,479 B2 * 12/2003 Kleine .................... B23B 51/02
175/394
9,969,012 B2 * 5/2018 Ogawa .................... B23B 51/02

FOREIGN PATENT DOCUMENTS

| CN | 1237253 C | 1/2006 |
| CN | 102847995 A | 1/2013 |

(Continued)

OTHER PUBLICATIONS

International Search Report corresponding to PCT Application No. PCT/EP2016/076648, dated Jan. 23, 2017 (German and English language document) (7 pages).

*Primary Examiner* — Robert E Fuller
(74) *Attorney, Agent, or Firm* — Maginot, Moore & Beck LLP (57) ABSTRACT

A drilling tool, in particular a rock drilling tool, for a portable machine tool, includes an axis of rotation, at least one spiral path, and at least one wear surface transition. The at least one spiral path is coiled about the axis of rotation along the axis of rotation and includes at least one wear surface having at least one bandwidth. There is a change in the at least one bandwidth of the at least one wear surface at a position of the at least one wear surface transition.

17 Claims, 2 Drawing Sheets

(52) U.S. Cl.
CPC ..... *B23B 2226/75* (2013.01); *B23B 2251/046* (2013.01); *B23B 2251/245* (2013.01); *B23B 2251/248* (2013.01); *B23B 2251/406* (2013.01); *B23B 2251/446* (2013.01)

(58) Field of Classification Search
CPC ........ B23B 2251/406; B23B 2251/245; B23B 2226/75; B28D 1/146
See application file for complete search history.

(56) References Cited

FOREIGN PATENT DOCUMENTS

| | | | |
|---|---|---|---|
| CN | 103726789 A | 4/2014 | |
| DE | 258329 | 9/1910 | |
| DE | 201 08 179 U1 | 8/2001 | |
| DE | 100 11 108 A1 | 9/2001 | |
| DE | 10 2011 016 686 A1 | 10/2012 | |
| DE | 10 2012 109 913 A1 | 4/2014 | |
| DE | 10 2013 109 796 A1 | 3/2015 | |
| EP | 1260296 A1 * | 11/2002 | ............. B23B 51/02 |
| EP | 2 845 672 A1 | 3/2015 | |
| FR | 2 808 462 A1 | 11/2001 | |
| JP | 8-155713 A | 6/1996 | |
| KR | 10-2013-0004432 A | 1/2013 | |
| KR | 10-2015-0121645 A | 10/2015 | |
| WO | 2015-029963 A1 | 3/2015 | |

\* cited by examiner

DRILLING TOOL

This application is a 35 U.S.C. § 371 National Stage Application of PCT/EP2016/076648, filed on Nov. 4, 2016, which claims the benefit of priority to Serial No. DE 10 2015 221 957.7, filed on Nov. 9, 2015 in Germany and Serial No. DE 10 2016 221 515.9, filed on Nov. 3, 2016 in Germany, the disclosures of which are incorporated herein by reference in their entirety.

BACKGROUND

A drilling tool, in particular a rock drilling tool, for a portable machine tool, with an axis of rotation and with at least one spiral thread which is wound around the axis of rotation along the axis of rotation, is already known from DE 100 11 108 A1. The spiral thread has at least one wearing surface.

SUMMARY

The disclosure is based on a drilling tool, in particular a rock drilling tool, for a portable machine tool, with an axis of rotation and with at least one spiral thread which is wound around the axis of rotation along the axis of rotation, wherein the spiral thread has at least one wearing surface.

It is proposed that the drilling tool has at least one wearing surface transition, at the position of which at least one width of the wearing surface is changed. The at least one spiral thread is preferably arranged helically around the axis of rotation. The at least one spiral thread can run in a right-handed or left-handed manner. In particular, the drilling tool has a maximum extent along the axis of rotation. The maximum extent is preferably smaller than 1000 mm, preferably smaller than 500 mm and particularly preferably smaller than 200 mm and very particularly preferably greater than 40 mm. The spiral thread of the drilling tool preferably extends, as viewed along the axis of rotation, from a drilling head of the drilling tool at least substantially as far as a shank of the drilling tool. The at least one spiral thread preferably extends between the drilling head and the shank. In particular, the shank can be designed as a round shank, as a hexagonal shank or as an SDS® shank (SDS®-max, SDS®-top, SDS®-plus, SDS®-quick). The spiral thread is preferably designed as a spiral body of the drilling tool, which has an at least substantially constant maximum diameter. In particular, the spiral body has a maximum diameter of smaller than 100 mm, preferably smaller than 50 mm, particularly preferably smaller than 20 mm and very particularly preferably greater than 1 mm. The spiral body is particularly preferably formed free from sintered carbide. However, it is also conceivable for the spiral body to be formed from sintered carbide. It is likewise conceivable for the drilling tool to have at least one further spiral thread or a multiplicity of further spiral threads which at least substantially comprises/comprise all of the features of the spiral thread described above and in the following. In particular, the drilling head is formed from sintered carbide or has a sintered carbide coating. However, it is also conceivable for the drilling head to be formed from another material appearing expedient to a person skilled in the art or to have another coating appearing expedient to a person skilled in the art. The drilling head can alternatively be formed, for example, from a ceramic or, for example, can have a coating produced by means of physical vapor deposition (PVD). The drilling head is preferably arranged directly adjacent to the spiral thread, in particular is formed integrally with the spiral thread. "Integrally" is intended to be understood as meaning in particular at least connected in an integrally bonded manner, for example by a welding process, a brazing process and/or another process appearing expedient to a person skilled in the art, and/or advantageously to be understood as meaning shaped in one piece, for example by production from a casting and/or by production in a single- or multi-component injection molding process and advantageously from an individual blank. The drilling head can have one or more sintered carbide cutting tips. The drilling head can have one or more cutting webs which extend transversely with respect to the axis of rotation. A sintered carbide cutting tip, a sintered carbide coating or the like are/is preferably arranged at least on the cutting web(s) for processing a workpiece. In a plane running at least substantially perpendicularly to the axis of rotation, the drilling head can have a linear, a polygonal, a triple zigzag-shaped, a cross-shaped or star-shaped configuration or another configuration appearing expedient to a person skilled in the art. The expression "substantially perpendicularly" is intended here to define in particular an orientation of a direction relative to a reference direction, wherein the direction and the reference direction enclose an angle of 90°, in particular as viewed in a plane, and the angle has a maximum deviation of in particular smaller than 8°, advantageously smaller than 5° and particularly advantageously smaller than 20.

Within this context, a "wearing surface of the spiral thread" is intended to be understood in particular as meaning an outermost surface of the spiral thread which is wound around the axis of rotation by 360° along the axis of rotation starting from the drilling head as far as the shank. In comparison to other elements and/or surfaces of the spiral thread, the wearing surface preferably has a greatest distance from the axis of rotation, as viewed in a direction running at least substantially perpendicularly to the axis of rotation. In particular, during processing of a workpiece, the wearing surface can be in direct contact with a workpiece. The wearing surface preferably has a coating which is provided to keep rubbing against the workpiece during processing low. "Provided" is intended to be understood as meaning in particular specially designed and/or equipped. The fact that an object is provided for a certain function is intended to be understood as meaning in particular that the object satisfies and/or carries out said certain function in at least one use and/or operating state. The wearing surface preferably runs helically about the axis of rotation. In particular, the wearing surface has at least one width and at least one length. Within this context, a "width of the wearing surface" is intended to be understood as meaning in particular a maximum size of a subsection of the wearing surface in a direction running at least substantially parallel to the axis of rotation, wherein the subsection of the wearing surface is arranged, as viewed along the axis of rotation, between two conveying helix low points which are at a minimum distance from the axis of rotation. In particular, the width has a maximum size of less than 50 mm, preferably less than 10 mm and particularly preferably less than 5 mm. The maximum size particularly preferably comprises a value from a range of values from 0 mm to 10 mm. "Substantially parallel" is intended to be understood here as meaning in particular an orientation of a direction relative to a reference direction, in particular in a plane, wherein the direction has a deviation in particular of smaller than 8°, advantageously smaller than 5° and particularly advantageously smaller than 2° in relation to the reference direction.

The spiral thread particularly preferably has at least one conveying helix. The conveying helix of the spiral thread is preferably provided, in particular as a result of rotation of the drilling tool about the axis of rotation of the drilling tool, to transport away abraded workpiece material during processing of a workpiece, in particular as a result of interaction with a conveying helix of a further spiral thread of the drilling tool. In particular, the spiral thread is provided to transport away drilling dust from a drill hole of the workpiece by means of the conveying helix during processing of a workpiece. The conveying helix preferably has, on a surface thereof, a coating and/or a structure which is provided to permit, in particular to positively influence, conveying of drilling dust out of the drill hole, for example by means of high frictional resistance or the like. The conveying helix preferably has at least one conveying helix low point which is at a minimum distance from the axis of rotation. Furthermore, the wearing surface has a boundary edge and a further boundary edge, which boundary edges bound the width in a direction running at least substantially parallel to the axis of rotation. In particular, the boundary edge is directly adjacent to the conveying helix. The boundary edge preferably merges into the conveying helix in a direction running at least substantially parallel to the axis of rotation. In particular, the further boundary edge is directly adjacent to a further conveying helix. The further boundary edge preferably merges into the further conveying helix in a direction running at least substantially parallel to the axis of rotation.

In particular, the boundary edge has at least one maximum pitch angle, in particular a maximum thread angle, with respect to the axis of rotation, which angle is at least substantially different from zero. In addition, the further boundary edge preferably has at least one maximum pitch angle from the axis of rotation, which angle is at least substantially different from zero. In particular, the boundary edge has a maximum pitch angle from the axis of rotation, which angle is smaller than 90°, preferably is smaller than 60° and particularly preferably is smaller than 30° and very particularly preferably is greater than 0°. The boundary edge preferably has a maximum pitch angle, in particular a maximum thread angle, from the axis of rotation, which angle corresponds to a value from a range of values of 35° to 45°, in particular when the drilling tool is configured with the spiral thread and the further spiral thread. The further boundary edge preferably has at least one maximum pitch angle from the axis of rotation, which angle is smaller than 90°, preferably smaller than 60° and particularly preferably smaller than 30° and very particularly preferably is greater than 0°. The further boundary edge preferably has a maximum pitch angle, in particular a maximum thread angle, from the axis of rotation, which angle corresponds to a value from a range of values of 35° to 45°, in particular when the drilling tool is configured with the spiral thread and the further spiral thread. Within this context, a "wearing surface length of the wearing surface" is intended to be understood as meaning in particular a maximum winding extent of the wearing surface from a drilling head of the drilling tool as far as a shank of the drilling tool, from a drilling head of the drilling tool as far as a wearing surface transition, from a wearing surface transition to a further wearing surface transition or from a wearing surface transition as far as a shank of the drilling tool.

Within this context, a "wearing surface transition of the drilling tool" is intended to be understood as meaning in particular a position along an overall extent of at least one spiral thread of the drilling tool, at which position a change of at least one characteristic variable defining the wearing surface takes place. In particular, the wearing surface transition is different from a transition between the drilling head and the spiral body and/or from a transition between the spiral body and the shank of the drilling tool. The wearing surface transition is particularly preferably formed differently from a step of a step drill. The drilling tool can have an individual wearing surface transition or a multiplicity of wearing surface transitions, in particular as viewed over an entire extent of at least one spiral thread or a plurality of spiral threads of the drilling tool. The width of the wearing surface is preferably changed at the position of the wearing surface transition. It is likewise conceivable for the drilling tool to have at least one further wearing surface transition, at the position of which the width has a further change. In addition, it is conceivable for the drilling tool to have at least more than two wearing surface transitions, at the positions of which the width has a further change.

The drilling tool is preferably at least substantially manufactured from steel. It is likewise conceivable for the drilling tool to be manufactured from another material appearing expedient to a person skilled in the art. By means of the configuration according to the disclosure of the drilling tool, different wearing surfaces can advantageously be realized, as viewed along the axis of rotation, depending on a workpiece to be machined. Furthermore, a large wearing surface can advantageously be realized in a region of the drilling tool in which a large degree of stress can be anticipated during machining of a workpiece. In addition, a small wearing surface can advantageously be realized in a region of the drilling tool in which a small degree of stress can be anticipated during machining of a workpiece. Furthermore, rubbing between the drilling tool and a surface of a workpiece to be machined can advantageously be kept small in a region with a small wearing surface. A rapid rotational speed of the drilling tool along the axis of rotation can advantageously be achieved. Uniform wear of the drilling tool can advantageously be achieved perpendicularly to the axis of rotation, as viewed along the axis of rotation of the drilling tool. Great stability of the drilling tool during machining of a workpiece can be made possible.

Furthermore, it is proposed that the width decreases downstream of the wearing surface transition, as viewed along the axis of rotation. In particular, the width in a region of the spiral thread in the vicinity of the drilling head is greater than in a region of the spiral thread in the vicinity of the shank. Within this context, a "region of the spiral thread in the vicinity of the drilling head" is intended to be understood as meaning in particular a region of the spiral thread that, in a direction running at least substantially parallel to, in particular coaxially with respect to, the axis of rotation, is at a minimum distance relative to the shank that is greater than 50% of the maximum extent of the drilling tool, preferably is greater than 70% of the maximum extent of the drilling tool, particularly preferably is greater than 80% of the maximum extent of the drilling tool and very particularly preferably is smaller than 99% of the maximum extent of the drilling tool. The width in the region in the vicinity of the shank is preferably smaller than in the region in the vicinity of the drilling head. Within this context, a "region in the vicinity of the shank" is intended to be understood as meaning in particular a region of the spiral thread that, in a direction running at least substantially parallel to, in particular coaxially with respect to, the axis of rotation, is at a minimum distance relative to the drilling head, in particular to a tip of the drilling head, that is greater than 50% of the maximum extent of the drilling tool, preferably is greater than 70% of the maximum extent of the drilling tool, particularly preferably is greater than 80% of the maximum extent of the drilling tool and very particularly preferably is smaller than 99% of the maximum extent of the drilling tool. The width preferably decreases downstream of the wearing surface transition, as viewed along the axis of rotation starting from the region in the vicinity of the drilling head in the direction of the region in the vicinity of the shank. The width is particularly preferably smaller downstream of the wearing surface transition than upstream of the wearing surface transition, as viewed along the axis of rotation starting from the region in the vicinity of the drilling head. In particular, the width downstream of the wearing surface transition decreases by more than 5%, preferably by more than 25% and particularly preferably by more than 50% in comparison to a configuration of the width upstream of the wearing surface transition. However, it is also conceivable for the width to increase downstream of the wearing surface transition, as viewed along the axis of rotation. By means of the configuration according to the disclosure of the drilling tool, a greater wearing surface can be realized in a region of the drilling tool in which there is a high degree of stress during processing of a workpiece in comparison to a region in which there is a low degree of stress during processing of a workpiece. In an advantageous manner, a greater wearing surface can be realized in the region of the drilling tool in the vicinity of the drilling head in comparison to the region in the vicinity of the shank, which region is arranged downstream of the wearing surface transition, as viewed along the axis of rotation starting from the region in the vicinity of the drilling head, since, during processing of a workpiece, in particular the region of the drilling tool in the vicinity of the drilling head comes into use for a long period and frequently with the workpiece to be processed.

In addition, it is proposed that the wearing surface decreases downstream of the wearing surface transition, as viewed along the axis of rotation, in particular as viewed with regard to partial surfaces along the entire extent of the spiral thread. At least an overall number of partial surfaces of the wearing surface is preferably changed. The wearing surface in the region in the vicinity of the drilling head is preferably large in comparison to the wearing surface in the region in the vicinity of the shank. The wearing surface in the region in the vicinity of the shank is preferably small in comparison to the wearing surface in the region in the vicinity of the drilling head. The wearing surface preferably decreases downstream of the wearing surface transition, as viewed along the axis of rotation starting from the region in the vicinity of the drilling head. The wearing surface is particularly preferably smaller downstream of the wearing surface transition than upstream of the wearing surface transition, as viewed along the axis of rotation starting from the region in the vicinity of the drilling head. In particular, the wearing surface downstream of the wearing surface transition decreases by more than 5%, preferably by more than 25% and particularly preferably by more than 50% in comparison to a configuration of the wearing surface upstream of the wearing surface transition. The effect which can advantageously be achieved is that, during machining of a workpiece, rubbing between the drilling tool and a workpiece surface can be kept small in a region with a small wearing surface. Furthermore, a rapid rotational speed of the drilling tool along the axis of rotation can advantageously be achieved. In an advantageous manner, an at least substantially uniform wear of the drilling tool can be achieved over an entire extent of the spiral thread depending on a degree of stress.

Furthermore, it is proposed that a thread height of the at least one spiral thread is changed downstream of the wearing surface transition, as viewed along the axis of rotation. Within this context, a "thread height of the at least one spiral thread" is intended to be understood as meaning in particular a section which runs at least substantially parallel to the axis of rotation and, during rotation of the drilling tool of 360° about the axis of rotation, covers a distance covered by a point of the spiral thread in a projection in a plane running at least substantially parallel to the axis of rotation. In particular, the thread height corresponds to a maximum distance between two adjacent boundary edges of spaced-apart partial surfaces of the wearing surface, as viewed in a direction running at least substantially parallel to the axis of rotation. In particular, when there is an increase or decrease in the thread height, an increase or decrease in the wearing surface length arises. The thread height is particularly preferably changed downstream of the wearing surface transition, as viewed from the region in the vicinity of the drilling head along the axis of rotation. By means of the configuration according to the disclosure of the drilling tool, a change in the rate of advance can advantageously be realized depending on a penetration depth of the drilling tool into a workpiece. Furthermore, the wearing surface length can advantageously be changed by means of the thread height. The wearing surface can advantageously be adapted to a degree of stress of the drilling tool downstream of the wearing surface transition during machining of a workpiece. A uniform wear of the drilling tool can advantageously be achieved perpendicularly to the axis of rotation, as viewed along the axis of rotation of the drilling tool. Great stability of the drilling tool can be made possible during machining of a workpiece.

Furthermore, it is proposed that the thread height increases downstream of the wearing surface transition, as viewed along the axis of rotation. In particular, the thread height in the region in the vicinity of the shank is large in comparison to the thread height in the region in the vicinity of the drilling head. The thread height in the region in the vicinity of the drilling head is preferably small in comparison to the thread height the region in the vicinity of the shank. The thread height preferably increases downstream of the wearing surface transition, as viewed starting from the region in the vicinity of the drilling head along the axis of rotation in the direction of the shank. The thread height is particularly preferably larger downstream of the wearing surface transition than upstream of the wearing surface transition, as viewed along the axis of rotation starting from the region in the vicinity of the drilling head in the direction of the shank. In particular, the thread height downstream of the wearing surface transition increases by more than 5%, preferably by more than 10% and particularly preferably by more than 25% in comparison to a configuration of the wearing surface upstream of the wearing surface transition. However, it is also conceivable for the thread height to decrease downstream of the wearing surface transition, as viewed along the axis of rotation. By means of the configuration according to the disclosure of the drilling tool, a high rate of advance in a workpiece can advantageously be realized. In addition, a smaller thread height and therefore a larger wearing surface can advantageously be realized in a region of the drilling tool in which there is a high degree of stress of the drilling tool during machining of a workpiece in comparison to a region in which there is a small degree of stress during machining of a workpiece. Furthermore, a smaller thread height can advantageously be realized in the region of the drilling tool in the vicinity of the drilling head, which region is arranged upstream of the wearing surface transition, as viewed along a direction of the axis of rotation of the drilling tool, in comparison to a region which is in the vicinity of the shank and is arranged downstream of the wearing surface transition, as viewed along the direction of the axis of rotation of the drilling tool.

In addition, it is proposed that the drilling tool has at least one spiral thread change, at the position of which a number of spiral threads is changed. It is conceivable, in an alternative configuration, for the drilling tool, in particular the rock drilling tool, for a portable machine tool to be formed independently of the wearing surface transition in order to achieve an object according to the disclosure and/or to achieve advantages according to the disclosure. In the alternative configuration, in particular in the configuration formed independently of the wearing surface transition, the drilling tool preferably comprises an axis of rotation, at least one spiral thread which is wound around the axis of rotation along the axis of rotation, wherein the spiral thread has at least one wearing surface, and at least one spiral thread change, at the position of which a number of spiral threads is changed. In particular, the spiral thread change is arranged in a region of the spiral body in which the wearing surface transition is at least substantially arranged. The spiral thread change can take place at the same position of the drilling tool as the wearing surface transition. The spiral thread change is particularly preferably different from a transition between the drilling head and the spiral body and/or from a transition between the spiral body and the shank of the drilling tool. It is also conceivable for the drilling tool to have at least one further spiral thread change, at the position of which a number of spiral threads is changed. Conveying of a large quantity of drilling dust out of the drill hole during machining of a workpiece can advantageously be achieved over a large length of the drilling tool, as viewed along the axis of rotation. The wearing surface can advantageously be adapted to a degree of stress of the drilling tool downstream of the spiral thread change during machining of a workpiece, as viewed along the axis of rotation. In an advantageous manner, uniform wear of the drilling tool can be achieved perpendicularly to the axis of rotation, as viewed along the axis of rotation. A particularly advantageous coordination of the drilling tool with an intended use can be made possible, in particular by an arrangement of a multiplicity of spiral threads in the region in the vicinity of the drilling head and by an arrangement of a small number of spiral threads in the region in the vicinity of the shank.

Furthermore, it is proposed that the drilling tool comprises at least one maximum outer diameter, in particular a nominal diameter, at least one drilling head tip and at least one spiral thread change, at the position of which a number of spiral threads is changed, wherein the spiral thread change and/or the wearing surface transition are/is arranged in a region and/or at a position along the axis of rotation which are/is at a minimum distance from the drilling head tip that is greater than an integral multiple of the maximum outer diameter, in particular a size value of the maximum outer diameter. A "multiple of the maximum outer diameter" is intended to be understood here as meaning in particular a mathematical product from the maximum size value and a number, such as, for example, 12 mm×1, 12 mm×2, 12 mm×2.5, 25 mm×3, or the like. The expression "larger than an integral multiple" is intended to define in particular a value which is in particular at least one hundredth, preferably at least one tenth larger than an integral multiple of a reference value. For example, a value which is greater than an integral multiple of a reference value can be 1.01, 1.1, 1.15, 1.25, 2.01, 2.1, 3.01, 3.1 or the like. Furthermore, it is also conceivable for the drilling tool additionally to have at least one additional spiral thread change in a region between the drilling head tip and the spiral thread change and/or the wearing surface transition, in particular in the case of a configuration of the drilling head with a rectilinear approach, in which preferably at least one spiral thread, in particular at least two spiral threads, is/are arranged directly adjacent to the drilling head, and preferably at least one additional spiral thread, in particular at least two additional spiral threads, is/are arranged adjacent to lateral flat surfaces of the drilling tool in the region in the vicinity of the drilling head. The at least one additional spiral thread, in particular the at least two additional spiral threads, preferably ends/end at the spiral thread change and/or at the wearing surface transition, in the case of a configuration of the drilling head with a rectilinear approach. In the case of a configuration of the drilling head with a rectilinear approach, the at least one additional spiral thread, in particular the at least two additional spiral threads, preferably extends/extend starting at maximum from the lateral flat surfaces of the drilling tool in the region in the vicinity of the drilling head as far as the spiral thread change and/or the wearing surface transition. The maximum outside diameter of the drilling tool extends at least substantially perpendicularly to the axis of rotation of the drilling tool. The maximum outer diameter is preferably greater than 1 mm. The maximum outer diameter is preferably smaller than 100 mm. However, it is also conceivable for the maximum outer diameter to have a maximum value or minimum value differing from the abovementioned value. The drilling head tip is preferably arranged on the axis of rotation. The drilling head tip is preferably formed by a point of the drilling head that is at a maximum distance from the shank of the drilling tool in a direction running at least substantially parallel to, in particular coaxially with respect to, the axis of rotation. The minimum distance of the region and/or of the position, in/at which the spiral thread change and/or the wearing surface transition are/is arranged, is preferably a smallest distance of the region and/or of the position relative to the drilling head tip along the axis of rotation and/or in a direction running at least substantially parallel to the axis of rotation. By means of the configuration according to the disclosure of the drilling tool, in a region of the drilling tool in which there is a high degree of stress during processing of a workpiece, a large wearing surface and/or a large number of spiral threads can advantageously be realized in comparison to a region in which there is a small degree of stress during processing of a workpiece. In an advantageous manner, a large wearing surface and/or a large number of spiral threads can be realized in the region of the drilling tool in the vicinity of the drilling head in comparison to the region which is in the vicinity of the shank and which is arranged downstream of the wearing surface transition and/or downstream of the spiral thread change, as viewed along the axis of rotation starting from the region in the vicinity of the drilling head, since, during machining of a workpiece, in particular the region of the drilling tool in the vicinity of the drilling head comes into contact for a long period and frequently with the workpiece to be machined.

In addition, it is proposed that the minimum distance from the drilling head tip is greater than twice the maximum outer diameter. In particular, the minimum distance from the drilling head tip is greater than 2.5 times the maximum outer diameter, in particular a size value of the maximum outer diameter. The spiral thread change and/or the wearing surface transition preferably take(s) place at the earliest at a position of the drilling tool that, in a direction running at least substantially parallel to, in particular coaxially with respect to, the axis of rotation of the drilling tool, is at a minimum distance relative to the drilling head tip, said minimum distance being greater than twice the numerical value of the maximum outer diameter, in particular in a configuration of the drilling tool without a rectilinear approach. A number of spiral threads in the region in the vicinity of the drilling head is preferably large. A number of spiral threads in the region in the vicinity of the shank is preferably small, in particular smaller than a number of spiral threads in the region in the vicinity of the drilling head. The drilling tool preferably has four spiral threads in the region in the vicinity of the drilling head. The drilling tool preferably has two spiral threads in the region in the vicinity of the shank. However, it is also conceivable for the drilling tool to have a number of spiral threads differing from four, for example, two, three, five, six or the like, in the region in the vicinity of the drilling head, and/or for the drilling tool to have a number of spiral threads differing from two, for example one, three, four or the like, in the region in the vicinity of the shank. A person skilled in the art will arrange a number of spiral threads appearing expedient to him/her in the region in the vicinity of the shank and/or in the region in the vicinity of the drilling head, in particular in order to obtain a drilling tool which is adapted to an intended use and in particular has a high degree of wear protection in the region in the vicinity of the drilling head and permits a particularly advantageous removal of abraded drilling material in the region in the vicinity of the shank. By means of the configuration according to the disclosure of the drilling tool, a large wearing surface and/or a large number of spiral threads can be realized in the region of the drilling tool in the vicinity of the drilling head in comparison to the region which is in the vicinity of the shank and is arranged downstream of the wearing surface transition and/or downstream of the spiral thread change, as viewed along the axis of rotation starting from the region in the vicinity of the drilling head, since, during machining of a workpiece, in particular the region of the drilling tool in the vicinity of the drilling head comes into contact for a long period and frequently with the workpiece to be machined.

Furthermore, it is proposed that a ratio of the minimum distance from the maximum outer diameter is greater than 1. In particular, a ratio of the minimum distance from the maximum outer diameter is greater than 1.5, preferably greater than 2, particularly preferably greater than 2.4 and very particularly preferably smaller than 10. By means of the configuration according to the disclosure of the drilling tool, in a region of the drilling tool in which there is a high degree of stress during processing of a workpiece, a large wearing surface and/or a large number of spiral threads can advantageously be realized in comparison to a region in which there is a small degree of stress during processing of a workpiece.

Furthermore, it is proposed that the drilling tool has a maximum useful length, wherein a ratio of the minimum distance from the maximum useful length is greater than 0.15. In particular, a ratio of the minimum distance to the maximum useful length is greater than 0.18, preferably greater than 0.2 and particularly preferably greater than 0.25. The maximum useful length of the drilling tool preferably extends starting from the drilling head tip as far as the shank in a direction running at least substantially parallel to, in particular coaxially with respect to, the axis of rotation. The spiral thread/spiral threads are/is preferably arranged in a manner already known to a person skilled in the art within a region defined by the maximum useful length. The drilling head is arranged in a manner already known to a person skilled in the art within a region defined by the maximum useful length. By means of the configuration according to the invention disclosure of the drilling tool, a large wearing surface and/or a large number of spiral threads can be realized in the region of the drilling tool in the vicinity of the drilling head in comparison to the region which is in the vicinity of the shank and is arranged downstream of the wearing surface transition and/or downstream of the spiral thread change, as viewed along the axis of rotation starting from the region in the vicinity of the drilling head, since, during machining of a workpiece, in particular the region of the drilling tool in the vicinity of the drilling head comes into contact for a long period and frequently with the workpiece to be machined.

In addition, it is proposed that the drilling tool comprises at least one drilling head tip and at least one spiral thread change, at the position of which a number of spiral threads is changed, wherein the spiral thread change and/or the wearing surface transition are/is arranged in a region and/or at a position along the axis of rotation which are/is at a minimum distance from the drilling head tip that is greater than twice a minimum thread height, in particular an absolute numerical value of the minimum thread height, of the spiral thread. In particular, the minimum distance from the drilling head tip is greater than 2.2 times, preferably greater than 2.5 times and particularly preferably than 3 times the minimum thread height, in particular an absolute numerical value of the minimum thread height. As is already known to a person skilled in the art, the minimum thread height of the spiral thread is a smallest distance in a direction running at least substantially parallel to, in particular coaxially with respect to, the axis of rotation between two spiral thread maximas of an individual spiral thread. By means of the configuration according to the disclosure of the drilling tool, a large wearing surface and/or a large number of spiral threads can advantageously be realized in the region of the drilling tool in the vicinity of the drilling head in comparison to the region which is in the vicinity of the shank and which is arranged downstream of the wearing surface transition and/or downstream of the spiral thread change, as viewed along the axis of rotation starting from the region in the vicinity of the drilling head, since, during machining of a workpiece, in particular the region of the drilling tool in the vicinity of the drilling head comes into contact for a long period and frequently with the workpiece to be machined.

It is advantageously proposed that the drilling tool has at least one further spiral thread which is wound around the axis of rotation along the axis of rotation, wherein the further spiral thread merges into or ends in the spiral thread in an immediate vicinity of the wearing surface transition. Within this context, an "immediate vicinity of the wearing surface transition" is intended to be understood as meaning in particular a region about the wearing surface transition which, as viewed along the axis of rotation, is at a maximum distance of less than 50 mm, preferably less than 10 mm and particularly preferably less than 5 mm from the wearing surface transition. The further spiral thread can merge into the spiral thread at the wearing surface transition. The further spiral thread preferably merges into the spiral thread at the spiral thread change. In particular, the further spiral thread is formed at least substantially analogously to the spiral thread. By means of the configuration according to the disclosure, an at least substantially flowing transition between the spiral thread and the further spiral thread can advantageously be achieved. A rapid removal of drilling dust from the drilling head of the drilling tool during machining of the workpiece can be achieved in a particularly advantageous manner in the region of the drilling tool in the vicinity of the drilling head, which region is arranged upstream of the wearing surface transition, as viewed along the axis of rotation. In addition, rapid removal of drilling dust from a drill hole of a workpiece during machining of the workpiece can be achieved particularly advantageously in a region of the drilling tool which is arranged downstream of the wearing surface transition, as viewed along the axis of rotation. Furthermore, rubbing between the drilling tool and a workpiece surface during machining of a workpiece can advantageously be kept low in a region of the drilling tool, which region is arranged downstream of the wearing surface transition, as viewed along a direction of the axis of rotation of the drilling tool.

Furthermore, it is proposed that the wearing surface transition is formed in an abrupt or flowing manner. A change in the width, the wearing surface, the thread height or another variable, appearing expedient to a person skilled in the art, of the wearing surface preferably takes place in an abrupt or flowing manner at the wearing surface transition. In the case of a flowing configuration of the wearing surface transition, a continuous transmission of force to the wearing surface can advantageously be made possible. Long durability of the wearing surface can be achieved. In the case of an abrupt configuration of the wearing surface transition, a high transmission of force to a workpiece can advantageously be made possible. A short processing time of a workpiece can advantageously be achieved.

Furthermore, it is proposed that a maximum distance of the wearing surface from the axis of rotation is changed downstream of the wearing surface transition, as viewed along the axis of rotation. In particular, the maximum distance runs in a direction running at least substantially perpendicularly to the axis of rotation. The maximum distance in the region in the vicinity of the shank is preferably large in comparison to the maximum distance in the region in the vicinity of the drilling head. The maximum distance in the region in the vicinity of the drilling head is particularly preferably small in comparison to the maximum distance in the region in the vicinity of the shank. The maximum distance preferably increases downstream of the wearing surface transition, as viewed along the axis of rotation starting from the region in the vicinity of the drilling head in the direction of the shank. It is likewise conceivable for the maximum distance to decrease downstream of the wearing surface transition, as viewed along the axis of rotation starting from the region in the vicinity of the drilling head in the direction of the shank. The maximum distance is particularly preferably larger downstream of the wearing surface transition than upstream of the wearing surface transition, as viewed along the axis of rotation starting from the region in the vicinity of the drilling head. In particular, the maximum distance increases downstream of the wearing surface transition by more than 5%, preferably by more than 10% and particularly preferably by more than 25% in comparison to a configuration of the wearing surface upstream of the wearing surface transition. By means of the configuration according to the disclosure, great stability of the drilling tool, in particular in the case of a long drilling tool, can advantageously be made possible during machining of a workpiece. Furthermore, a high degree of rigidity of the drilling tool in the region of the drilling tool in the vicinity of the shank can advantageously be achieved. In addition, a centering function can advantageously be achieved.

In addition, it is proposed that the drilling tool has at least one further wearing surface transition, at the position of which the wearing surface is changed. The wearing surface preferably decreases downstream of the further wearing surface transition, as viewed along the axis of rotation starting from the region in the vicinity of the shank. The wearing surface is particularly preferably smaller downstream of the further wearing surface transition than upstream of the further wearing surface transition, as viewed along the axis of rotation starting from the region in the vicinity of the shank. The effect which can advantageously be achieved is that rubbing between the drilling tool and a workpiece surface during machining of a workpiece can be kept low in a region with a small wearing surface.

Furthermore, the disclosure is based on a method, in particular a metal-cutting method, for producing a drilling tool as claimed in at least one of the preceding claims, wherein, in at least one method step, the at least one, in particular first, spiral thread of the drilling tool is produced with a tool.

It is proposed that, in at least one method step, at least one further spiral thread of the drilling tool, that is different from the, in particular first, spiral thread, is produced with the tool. In particular, the, in particular first, spiral thread and the further spiral thread are produced with the same tool in a maximum of two method steps. However, it is also conceivable for the, in particular first, spiral thread and the further spiral thread to be able to be produced with the same tool in more than a maximum of two method steps. The spiral thread and the further spiral thread are preferably produced without changing the tool. By means of the method according to the disclosure, time- and/or cost-saving production of a drilling tool can advantageously be realized. A rapid pulse during production of a drilling tool can be particularly advantageously achieved.

The drilling tool according to the disclosure and/or the method according to the disclosure are/is not intended to be restricted here to the above-described application and embodiment. In particular, in order to carry out an operating mode described herein, the drilling tool according to the disclosure and/or the method according to the disclosure can have a number of individual elements, components and units and method steps differing from a number thereof mentioned herein. In addition, in the value ranges indicated in this disclosure, values lying within the limits mentioned are also intended to be considered to be disclosed and usable as desired.

BRIEF DESCRIPTION OF THE DRAWINGS

Further advantages emerge from the description below of the drawing. The drawing illustrates four exemplary embodiments of the disclosure. The drawing, the description and the claims contain numerous features in combination. A person skilled in the art will expediently also consider the features individually and combine them into meaningful further combinations.

In the drawing.

DETAILED DESCRIPTION

Figure 1:
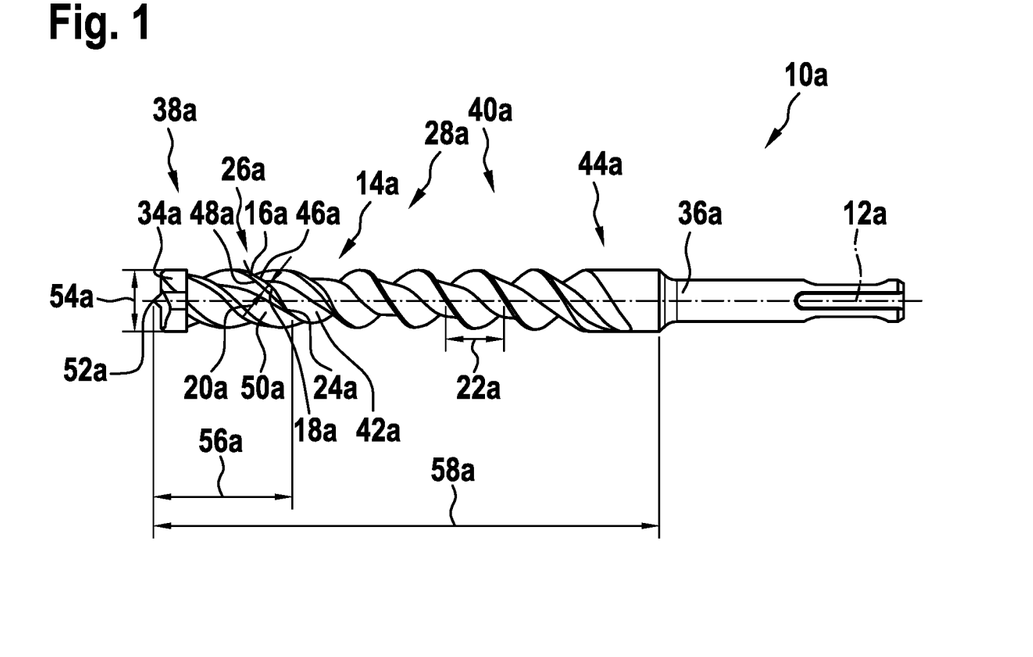
FIG. 1 shows a schematic illustration of a first exemplary embodiment of a drilling tool according to the disclosure for a portable machine tool.

FIG. 1 shows a first exemplary embodiment of a drilling tool 10a for a portable machine tool (not illustrated specifically here). The portable machine tool has a configuration already known to a person skilled in the art, such as, for example, a configuration in the form of a hand-held drill or the like which has at least one tool-holding fixture, in particular at least one drill chuck. The drilling tool 10a is preferably designed in the form of a rock drilling tool. The drilling tool 10a is manufactured in particular from steel. It is also conceivable for the drilling tool 10a to be manufactured from another material appearing expedient to a person skilled in the art. The drilling tool 10a comprises an axis of rotation 12a and at least one spiral thread 14a which is wound around the axis of rotation 12a along the axis of rotation 12a. The spiral thread 14a here has at least one wearing surface 16a. The drilling tool 10a preferably has a drilling head 34a which is manufactured in particular from sintered carbide. Furthermore, the drilling tool 10a comprises at least one wearing surface transition 18a, at the position of which at least one width 20a of the wearing surface 16a is changed. The wearing surface transition 18a takes place in an abrupt manner. The width 20a decreases downstream of the wearing surface transition 18a, as viewed along the axis of rotation 12a. In particular, the width 20a decreases downstream of the wearing surface transition 18a, as viewed along the axis of rotation 12a starting from the drilling head 34a. Furthermore, the wearing surface 16a decreases downstream of the wearing surface transition 18a, as viewed along the axis of rotation 12a. The wearing surface 16a preferably decreases downstream of the wearing surface transition 18a, as viewed along the axis of rotation 12a starting from the drilling head 34a. Furthermore, the drilling tool 10a preferably comprises a shank 36a. The spiral thread 14a is directly adjacent to the drilling head 34a, as viewed along the axis of rotation 12a, in a region 38a of the drilling tool 10a in the vicinity of the drilling head. The spiral thread 14a preferably extends, as viewed along the axis of rotation 12a, starting from the drilling head 34a of the drilling tool 10a at least substantially as far as the shank 36a of the drilling tool 10a. The wearing surface 16a is preferably formed along a spiral body 40a of the drilling tool 10a, as viewed along the axis of rotation 12a. The wearing surface 16a is preferably wound around the axis of rotation 12a at least substantially directly adjacent to the drilling head 34a of the drilling tool 10a, as viewed along the axis of rotation 12a. The spiral thread 14a in particular has at least one conveying helix 42a. The conveying helix 42a is preferably wound around the axis of rotation 12a at least substantially directly adjacent to the drilling head 34a of the drilling tool 10a, as viewed along the axis of rotation 12a. The conveying helix 42a is preferably formed along the spiral body 40a, as viewed along the axis of rotation 12a. Furthermore, the drilling tool 10a has at least one further spiral thread 26a which is wound around the axis of rotation 12a along the axis of rotation 12a. The further spiral thread 26a merges here into the spiral thread 14a in an immediate vicinity 28a of the wearing surface transition 18a. The conveying helix 50a merges into the conveying helix 42a in the immediate vicinity 28a of the wearing surface transition 18a. The wearing surface 16a has a boundary edge 46a and a further boundary edge 48a. The boundary edge 46a is directly adjacent to the conveying helix 42a of the spiral thread 14a. The further boundary edge 48a is directly adjacent to a further conveying helix 50a of the further spiral thread 26a.

In the exemplary embodiment shown in FIG. 1, four spiral threads 14a, 26a which are wound around the axis of rotation 12a along the axis of rotation 12a are directly adjacent to the drilling head 34a. It is likewise conceivable for more or fewer than four spiral threads 14a, 26a which are wound around the axis of rotation 12a along the axis of rotation 12a to be directly adjacent to the drilling head 34a. Furthermore, the drilling tool 10a comprises at least one spiral thread change 24a, at the position of which a number of spiral threads 14a, 26a is changed. The number of spiral threads 14a, 26a is preferably changed at the position of the wearing surface transition 18a. In particular, the number of spiral threads 14a, 26a is changed from four to two at the position of the spiral thread change 24a. It is likewise conceivable for the number of spiral threads 14a, 26a to change from four to three or from four to one at the position of the spiral thread change 24a. In addition, it is conceivable for the number of spiral threads 14a, 26a to change from a number appearing expedient to a person skilled in the art to a different number appearing expedient to a person skilled in the art at the position of the spiral thread change 24a. At the position of the spiral thread change 24a, the further spiral thread 26a merges into the spiral thread 14a. Starting from the position of the spiral thread change 24a, as viewed along the axis of rotation 12a, in particular two spiral threads 14a, 26a are wound about the axis of rotation 12a along the axis of rotation 12a as far as a region 44a of the drilling tool 10a in the vicinity of the shank. In particular, the spiral thread 14a is wound around the axis of rotation 12a along the axis of rotation 12a as far as the region 44a in the vicinity of the shank, as viewed starting from the position of the spiral thread change 24a along the axis of rotation 12a. Furthermore, the spiral thread 14a has a thread height 22a. The thread height 22a of the spiral thread 14a is changed downstream of the wearing surface transition 18a, as viewed along the axis of rotation 12a. Furthermore, the thread height 22a increases downstream of the wearing surface transition 18a, as viewed along the axis of rotation 12a. The thread height 22a preferably increases downstream of the wearing surface transition 18a, as viewed starting from the drilling head 34a along the axis of rotation 12a in the direction of the shank 36a.

The drilling tool 10a comprises at least one maximum outer diameter 52a, in particular a nominal diameter, at least one drilling head tip 54a and at least the spiral thread change 24a, at the position of which a number of spiral threads 14a, 26a is changed, wherein the spiral thread change 24a and/or the wearing surface transition 18a are/is arranged in a region and/or at a position along the axis of rotation 12a that are/is at a minimum distance 56a from the drilling head tip 54a that is greater than an integral multiple of the maximum outer diameter 52a. The minimum distance 56a from the drilling head tip 54a is preferably greater than twice the maximum outer diameter 52a. A ratio of the minimum distance 56a from the maximum outer diameter 52a is in particular greater than 1. The drilling tool 10a comprises a maximum useful length 58a, wherein a ratio of the minimum distance 56a from the maximum useful length 58a is preferably greater than 0.15. The drilling tool 10a comprises at least the drilling head tip 54a and at least the spiral thread change 24a, at the position of which a number of spiral threads 14a, 26a is changed, wherein the spiral thread change 24a and/or the wearing surface transition 18a are/is arranged in a region and/or at a position along the axis of rotation 12a which are/is at a minimum distance 56a from the drilling head tip 54a that is greater than twice a minimum thread height 22a of the spiral thread 14a.

A cross-sectional change and/or a change in the geometrical moment of inertia of the drilling tool 10a preferably take/takes place at the spiral thread change 24a and/or at the wearing surface transition 18a. A change in a cross section and/or in a geometrical moment of inertia of the drilling tool 10a take/takes place monotonously at the spiral thread change 24a and/or at the wearing surface transition 18a. By means of the drilling tool 10a, a large wearing surface 16a and/or a large number of spiral threads 16a, 26a can advantageously be realized in a region of the drilling tool 10a in which there is a high degree of stress during processing of a workpiece in comparison to a region in which there is a low degree of stress during processing of a workpiece. A large wearing surface 16a and/or a large number of spiral threads 16a, 26a can advantageously be realized in the region 38a of the drilling tool 10a in the vicinity of the drilling head in comparison to the region 44a which is in the vicinity of the shank and is arranged downstream of the wearing surface transition 18a and/or downstream of the spiral thread change 24a, as viewed along the axis of rotation 12a starting from the region 38a in the vicinity of the drilling head, since, during processing of a workpiece, in particular the region of the drilling tool in the vicinity of the drilling head comes into contact for a long period and frequently with the workpiece to be machined.

The drilling tool 10a is produced by means of a method, in particular by means of a metal-cutting method, wherein, in at least one method step, the at least one, in particular first, spiral thread 14a is produced with a tool. In at least one method step of the method, at least the further spiral thread 26a, which is different from the, in particular first, spiral thread 14a, is produced with the tool.

FIGS. 2 to 5 show further exemplary embodiments of the disclosure. The descriptions below and the drawings are essentially limited to the differences between the exemplary embodiments, wherein reference can basically also be made with regard to components with identical designation, in particular with regard to components with identical reference signs, to the drawings and/or the description of the other exemplary embodiments, in particular of FIG. 1. In order to distinguish between the individual exemplary embodiments of the disclosure, the respective reference signs in FIGS. 1 to 4 are followed by the letters a to d. In the exemplary embodiments of FIGS. 2 to 4, the letter a is replaced by the letters b to d.

Figure 2:
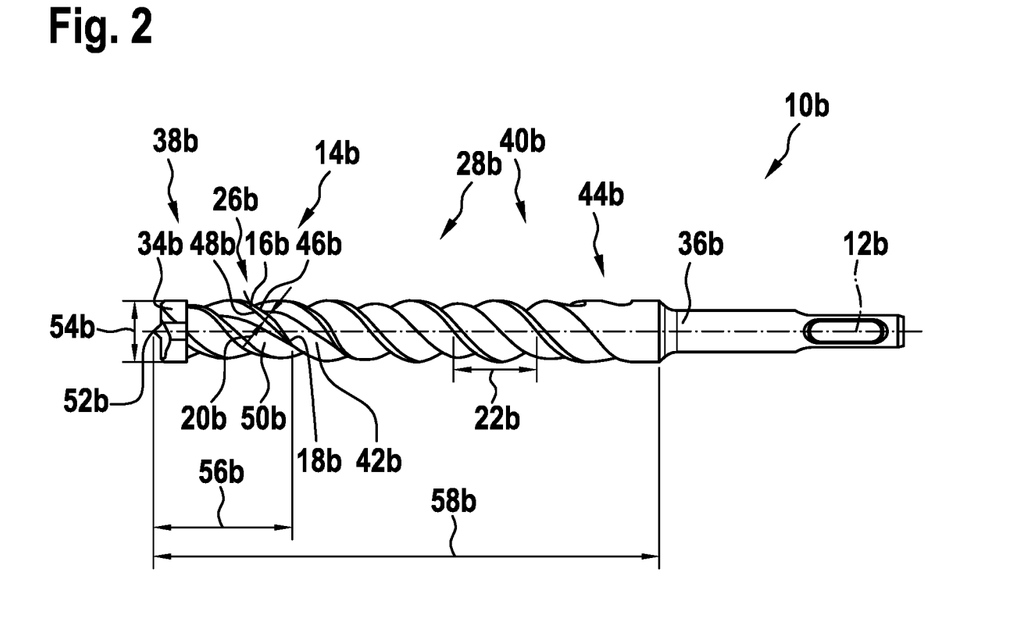
FIG. 2 shows a schematic illustration of a second exemplary embodiment of a drilling tool according to the disclosure for a portable machine tool.

FIG. 2 shows a second exemplary embodiment of a drilling tool 10b for a portable machine tool (not illustrated specifically here). The drilling tool 10b comprises an axis of rotation 12b and at least one spiral thread 14b which is wound around the axis of rotation 12b along the axis of rotation 12b. The drilling tool 10b comprises at least one wearing surface transition 18b, at the position of which at least one width 20b of the wearing surface 16b is changed. The width 20b decreases downstream of the wearing surface transition 18b, as viewed along the axis of rotation 12b. In particular, the width 20b decreases downstream of the wearing surface transition 18b, as viewed along the axis of rotation 12b starting from a drilling head 34b of the drilling tool 10b. The wearing surface transition 18b takes place in a flowing manner. Downstream of the wearing surface transition 18b, as viewed along the axis of rotation 12b starting from the drilling head 34b, the width 20b has a value of less than 1 mm and more than 0 mm. In addition to the spiral thread 14b, the drilling tool 10b comprises at least three further spiral threads 26b. Overall, the drilling tool 20b has four spiral threads 14b, 26b which can be designed differently from one another or analogously to one another. However, it is also conceivable for the drilling tool 12b to have a number of spiral threads 14b, 26b differing from four. The four spiral threads 14b, 26b are directly adjacent to the drilling head 34b, and are wound around the axis of rotation 12b along the axis of rotation 12b as far as a region 44b of the drilling tool 10b in the vicinity of the shank. The drilling tool 10b is formed free from a spiral thread change. A number of spiral threads is consistent, as viewed along the axis of rotation 12b. Furthermore, the spiral threads 14b have a thread height 22b. The thread height 22b of the spiral thread 14b downstream of the wearing surface transition 18b is consistent, as viewed along the axis of rotation 12b. With respect to further features and functions of the drilling tool 10b illustrated in FIG. 2, reference should be made to the description of the drilling tool 10a illustrated in FIG. 1.

Figure 3:
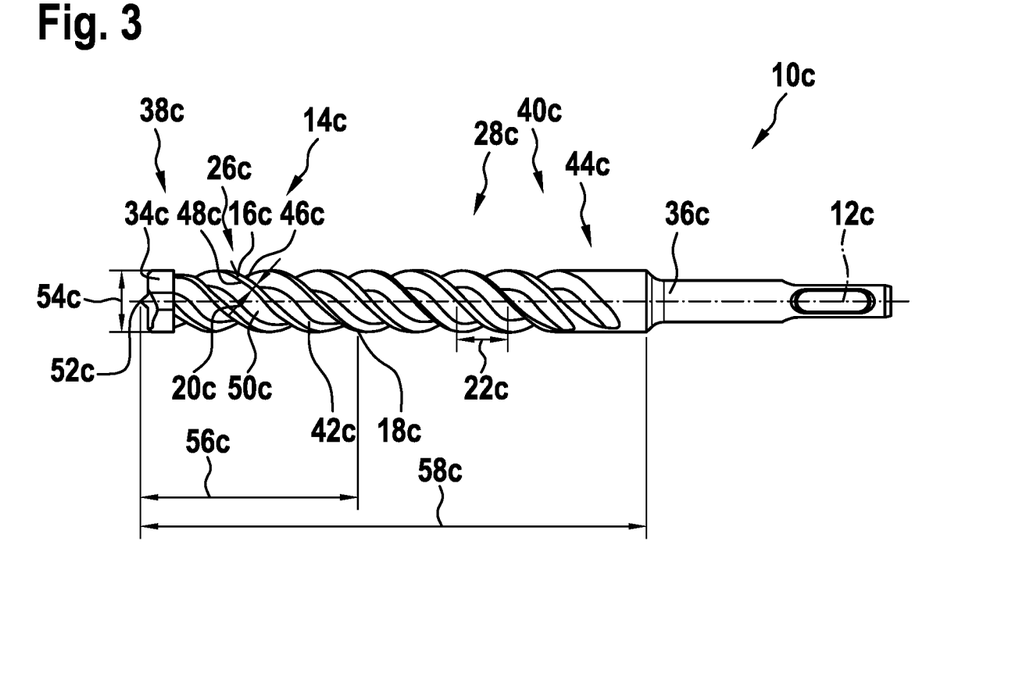
FIG. 3 shows a schematic illustration of a third exemplary embodiment of a drilling tool according to the disclosure for a portable machine tool.

FIG. 3 shows a third exemplary embodiment of a drilling tool 10c for a portable machine tool (not illustrated specifically here). The drilling tool 10c comprises an axis of rotation 12c and at least one spiral thread 14c which is wound around the axis of rotation 12c along the axis of rotation 12c. The drilling tool 10c comprises at least one wearing surface transition 18c, at the position of which at least one width 20c of the wearing surface 16c is changed. The width 20c decreases downstream of the wearing surface transition 18c, as viewed along the axis of rotation 12c. In particular, the width 20c decreases downstream of the wearing surface transition 18c, as viewed along the axis of rotation 12c starting from a drilling head 34c of the drilling tool 10c. A change in the width 20c takes place at the wearing surface transition 18c in a flowing manner. Downstream of the wearing surface transition 18c, as viewed along the axis of rotation 12c starting from the drilling head 34c in the direction of a shank 36c of the drilling tool 10c, the width 20c has a value of at least 30% of a value of the width 20c upstream of the wearing surface transition 18c. In addition to the spiral thread 14c, the drilling tool 10c comprises at least three further spiral threads 26c. Overall, the drilling tool 12c has four spiral threads 14c, 26c which can be designed differently from one another or analogously to one another. However, it is also conceivable for the drilling tool 12c to have a number of spiral threads 14c, 26c differing from four. The four spiral threads 14c, 26c are directly adjacent to the drilling head 34, and are wound around the axis of rotation 12c along the axis of rotation 12c as far as a region 44c of the drilling tool 10c in the vicinity of the shank. Furthermore, the drilling tool 10c is formed free from a spiral thread change. A number of spiral threads 14c, 26c is consistent, as viewed along the axis of rotation 12c. Furthermore, the spiral thread 14c has a thread height 22c. The thread height 22c of the spiral thread 14c downstream of the wearing surface transition 18c is consistent, as viewed along the axis of rotation 12c. In respect of further features and functions of the drilling tool 10c illustrated in FIG. 3, reference should be made to the description of the drilling tool 10a illustrated in FIG. 1.

Figure 4:
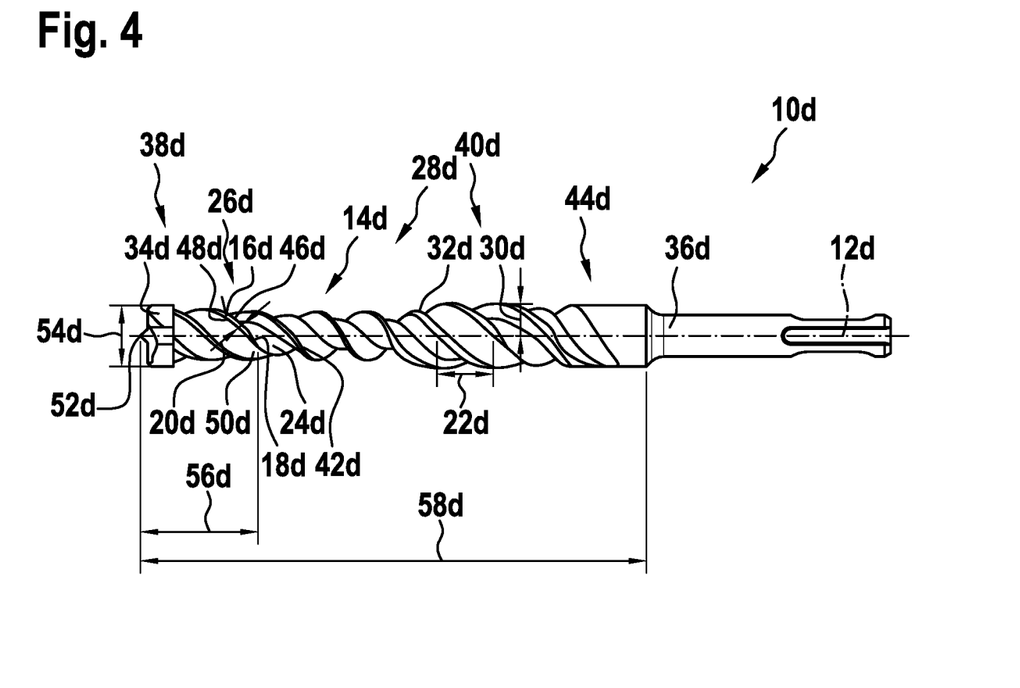
FIG. 4 shows a schematic illustration of a fourth exemplary embodiment of a drilling tool according to the disclosure for a portable machine tool.

FIG. 4 shows a fourth exemplary embodiment of a drilling tool 10d for a portable machine tool (not illustrated specifically here). The drilling tool 10d comprises an axis of rotation 12d and at least one spiral thread 14d which is wound around the axis of rotation 12d along the axis of rotation 12d. The drilling tool 10d comprises at least one wearing surface transition 18d, at the position of which at least one width 20d of the wearing surface 16d is changed.

The drilling tool 10d comprises at least one further wearing surface transition 32d, at the position of which the wearing surface 16d is changed. The wearing surface 16d preferably increases at the at least one further wearing surface transition 32d, as viewed along the axis of rotation 12d starting from a drilling head 34d of the drilling tool 10d in the direction of a shank 36d of the drilling tool 10d. The further wearing surface transition 32d is formed in a flowing manner. An increase in the wearing surface 16d takes place at the further wearing surface transition 32d in a flowing manner. Furthermore, a maximum distance 30d of the wearing surface 16d from the axis of rotation 12d is changed downstream of the wearing surface transition 18d, as viewed along the axis of rotation 12d. In particular, the maximum distance 30d of the wearing surface 16d from the axis of rotation 12d is changed downstream of the wearing surface transition 18d, as viewed along the axis of rotation 12d starting from a drilling head 34d of the drilling tool 34d in the direction of the shank 36d of the drilling tool 10d. The maximum distance 30d of the wearing surface 16d in relation to the axis of rotation 12d is preferably changed downstream of the further wearing surface transition 32d, as viewed along the axis of rotation 12d starting from the drilling head 34d in the direction of a shank 36d of the drilling tool 10d. The maximum distance 30d of the wearing surface 16d in relation to the axis of rotation 12d particularly preferably increases downstream of the further wearing surface transition 32d, as viewed along the axis of rotation 12d starting from the drilling head 34d in the direction of the shank 36d of the drilling tool 10d. The width 20d of the wearing surface 16d particularly preferably increases at the position of the further wearing surface transition 32d. In particular, the width 20d increases downstream of the wearing surface transition 16d, as viewed along the axis of rotation 12d. In respect of further features and functions of the drilling tool 10d illustrated in FIG. 4, reference should be made to the description of the drilling tool 10a illustrated in FIG. 1.

The invention claimed is:

1. A drilling tool for a portable machine tool, comprising:
   at least one spiral thread wound around an axis of rotation of the drilling tool along the axis of rotation, the at least one spiral thread including a first spiral thread and a second spiral thread, the first spiral thread having at least one wearing surface with at least one width;
   at least one wearing surface transition, at a position of which the at least one width of the at least one wearing surface is changed; and
   at least one spiral thread change, at a position of which a number of the at least one spiral threads is changed,
   wherein the second spiral thread merges into the first spiral thread at the at least one spiral thread change, and
   wherein the at least one spiral thread change is at the at least one wearing surface transition.

2. The drilling tool as claimed in claim 1, wherein the at least one width decreases downstream of the at least one wearing surface transition along the axis of rotation.

3. The drilling tool as claimed in claim 1, wherein a thread height of the first spiral thread is changed downstream of the at least one wearing surface transition along the axis of rotation.

4. The drilling tool as claimed in claim 3, wherein the thread height increases downstream of the at least one wearing surface transition along the axis of rotation.

5. The drilling tool as claimed in claim 1, further comprising:
   at least one drilling head tip,
   wherein the drilling tool includes at least one maximum outer diameter, and
   wherein the at least one spiral thread change and/or the wearing surface transition is arranged in a region and/or at a position along the axis of rotation located at a minimum distance from the at least one drilling head tip that is greater than an integral multiple of the at least one maximum outer diameter.

6. The drilling tool as claimed in claim 5, wherein the minimum distance from the at least one drilling head tip is greater than twice the at least one maximum outer diameter.

7. The drilling tool as claimed in claim 5, wherein a ratio of the minimum distance to the at least one maximum outer diameter is greater than 1.

8. The drilling tool as claimed in claim 5, wherein a ratio of the minimum distance to a maximum useful length of the drilling tool is greater than 0.15.

9. The drilling tool as claimed in claim 5, wherein the at least one maximum outer diameter is a nominal diameter.

10. The drilling tool as claimed in claim 1, further comprising:
    at least one drilling head tip,
    wherein the at least one spiral thread change and/or the at least one wearing surface transition is arranged in a region and/or at a position along the axis of rotation located at a minimum distance from the at least one drilling head tip that is greater than twice a minimum thread height of the at least one spiral thread.

11. The drilling tool as claimed in claim 1, wherein at least a maximum distance of the at least one wearing surface from the axis of rotation is changed downstream of the at least one wearing surface transition along the axis of rotation.

12. The drilling tool as claimed in claim 1, further comprising:
    at least one further wearing surface transition, at a position of which the at least one wearing surface is changed.

13. The drilling tool as claimed in claim 1, wherein the drilling tool is a rock drilling tool.

14. The drilling tool as claimed in claim 1, wherein a cross section of the drilling tool and/or a geometrical moment of inertia of the drilling tool changes at the at least one spiral thread change.

15. The drilling tool as claimed in claim 1, wherein a cross section of the drilling tool and/or a geometrical moment of inertia of the drilling tool changes at the at least one wearing surface transition.

16. A method for producing a drilling tool for a portable machine tool, comprising:
    producing at least one spiral thread of the drilling tool with a tool, the at least one spiral thread including a first spiral thread and a second spiral thread,
    wherein the at least one spiral thread is wound around an axis of rotation of the drilling tool along the axis of rotation,
    wherein the first spiral thread includes at least one wearing surface having at least one width, and
    wherein the drilling tool includes at least one wearing surface transition, at a position of which the at least one width of the at least one wearing surface is changed,
    wherein the drilling tool includes at least one spiral thread change, at a position of which a number of the at least one spiral threads is changed,
    wherein the second spiral thread merges into the first spiral thread at the at least one spiral thread change, and
    wherein the at least one spiral thread change is at the at least one wearing surface transition.

17. The method as claimed in claim 16, wherein the method is a metal-cutting method.

* * * * *

UNITED STATES PATENT AND TRADEMARK OFFICE
CERTIFICATE OF CORRECTION

PATENT NO. : 10,695,951 B2
APPLICATION NO. : 15/773677
DATED : June 30, 2020
INVENTOR(S) : Rainer Widmann et al.

Page 1 of 1

It is certified that error appears in the above-identified patent and that said Letters Patent is hereby corrected as shown below:

On the Title Page

In item (30) "Foreign Application Priority Data" please add the following foreign application priority claim:
--Nov. 9, 2015 (DE).....................10 2015 221 957--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*